US008475096B2

(12) United States Patent  (10) Patent No.: US 8,475,096 B2
Spencer et al.  (45) Date of Patent: Jul. 2, 2013

(54) TONNEAU COVER CARGO CONTAINMENT TRACK RAIL SYSTEM

(75) Inventors: Michael R. Spencer, Hubbard, NE (US); Kelly Kneifl, Yankton, SD (US); Timothy Nelson, Yankton, SD (US)

(73) Assignee: Truxedo, Inc., Yankton, SD (US)

( * ) Notice: Subject to any disclaimer, the term of this patent is extended or adjusted under 35 U.S.C. 154(b) by 806 days.

(21) Appl. No.: 12/414,811

(22) Filed: Mar. 31, 2009

(65) Prior Publication Data

US 2009/0243331 A1  Oct. 1, 2009

Related U.S. Application Data

(60) Provisional application No. 61/041,031, filed on Mar. 31, 2008.

(51) Int. Cl.
*B60P 7/02* (2006.01)
*B60P 7/08* (2006.01)

(52) U.S. Cl.
USPC ............. 410/96; 410/104; 410/105; 410/108; 296/100.16

(58) Field of Classification Search
USPC ................. 410/105, 106, 101, 110, 108, 115, 410/96, 99, 104; 296/98, 100.01, 100.11–100.16, 100.18
See application file for complete search history.

(56) References Cited

U.S. PATENT DOCUMENTS

| | | | | |
|---|---|---|---|---|
| 4,739,528 A * | 4/1988 | Allen | ................................ | 5/119 |
| 4,979,776 A * | 12/1990 | Schweickert | ............ | 296/100.15 |
| 5,301,627 A * | 4/1994 | Czipri | ............................ | 114/218 |
| 5,533,848 A * | 7/1996 | Davis | ............................ | 410/105 |
| 5,676,508 A * | 10/1997 | Weicht | ........................ | 410/101 |
| 5,765,978 A * | 6/1998 | Looker et al. | ................ | 410/105 |
| 6,050,763 A * | 4/2000 | Swailes | ........................ | 410/107 |
| 6,568,740 B1 * | 5/2003 | Dimmer | ..................... | 296/100.16 |
| 6,575,520 B1 * | 6/2003 | Spencer | .................... | 296/100.15 |
| 7,229,121 B2 * | 6/2007 | Fox et al. | ................. | 296/100.16 |
| 2002/0164225 A1 * | 11/2002 | Snyder et al. | ................ | 410/104 |
| 2006/0051177 A1 * | 3/2006 | Yu et al. | ....................... | 410/104 |

* cited by examiner

*Primary Examiner* — Glenn Dayoan
*Assistant Examiner* — Sunsurraye Westbrook
(74) *Attorney, Agent, or Firm* — Harness, Dickey & Pierce, P.L.C.

(57) ABSTRACT

A tonneau cover cargo containment track rail system including a cargo hold down and at least one tonneau cover rail. The cargo hold down has a base portion and a handle portion. The handle portion is operably attached to the base portion for movement between an engaged position and a disengaged position. The tonneau cover rail has a first attachment mechanism attached thereto. The first attachment mechanism is adapted to receive a portion of the cargo hold down to retain the cargo hold down in engagement with the tonneau cover rail while permitting the cargo hold down to move with respect to the tonneau cover rail.

23 Claims, 5 Drawing Sheets

TONNEAU COVER CARGO CONTAINMENT TRACK RAIL SYSTEM

REFERENCE TO RELATED APPLICATION

This application claims priority to U.S. Provisional Applic. No. 61/041,031, entitled TONNEAU CARGO CONTAINMENT TRACK RAIL SYSTEM, which was filed on Mar. 31, 2008, the details of which are incorporated herein by reference.

FIELD OF THE INVENTION

The invention relates generally to storage systems for vehicles. More particularly, the invention relates to a tonneau cover cargo containment track rail system.

BACKGROUND OF THE INVENTION

Pickups are a quite popular type of vehicle because the pickups enable objects of various sizes to be placed in the bed of the pickup and then transported. The bed of the pickup generally has a floor surface that is bounded by a front wall, side walls and a back wall. At least one of the front wall, the side walls and the back wall may be movable to facilitate placing objects into the bed and removing objects from the bed.

While the front wall, the side walls and the back wall preclude objects from sliding out of the pickup bed, these walls do not retain the objects at specific locations within the pickup bed.

Even when the pickup bed is at least partially covered with a tonneau cover, there is need to place objects stored in the pickup bed in an enclosure to restrict the movement of such objects within the pickup bed. There are generally two types of tonneau covers—hard and soft. The hard tonneau covers have a relatively hard surface that extends over the open top. In some instances, the hard top is provided in more than one section.

The soft tonneau covers include a flexible material that extends across the open top of the pickup bed. When not in use, it is possible to roll up many types of soft tonneau covers for storage.

Either style of tonneau cover typically attaches to the sides of the pickup bed. The attachment of the tonneau cover to the pickup bed thereby restricts the ability to use toolboxes that extend over the sides of the pickup bed.

SUMMARY OF THE INVENTION

An embodiment of the invention is directed to a cargo containment rail system. The cargo containment rail system enables objects stored in the bed of a pickup to be secured to prevent movement in the pickup bed. The cargo containment rail system generally includes at least one rail and a cargo hold down. The invention may also include at least one clamping mechanism to mount the cargo containment rail system with respect to the pickup bed.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

Figure 1:
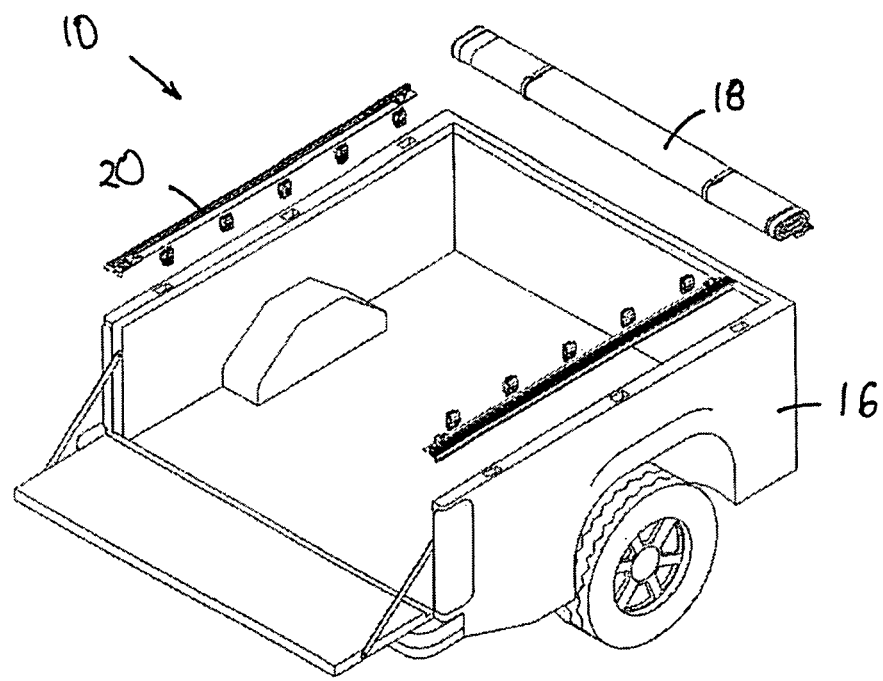
FIG. 1 is a perspective view of a pickup bed in conjunction with a tonneau cover cargo containment track rail system may be used.

An embodiment of the invention is directed to a cargo containment rail system, as illustrated at 10 in the figures. The cargo containment rail system 10 enables objects placed in a pickup bed 16 to be retained in a stationary position in the pickup bed 16, as illustrated in FIG. 1. The cargo containment rail system 10 thereby prevents damage to the objects or the pickup bed 16 caused by movement of the objects within the pickup bed 16. The cargo containment rail system 10 is suited for use with a soft tonneau cover that may substantially cover the pickup bed 16. A tonneau cover 18 may be used in conjunction with the invention.

Figure 2:
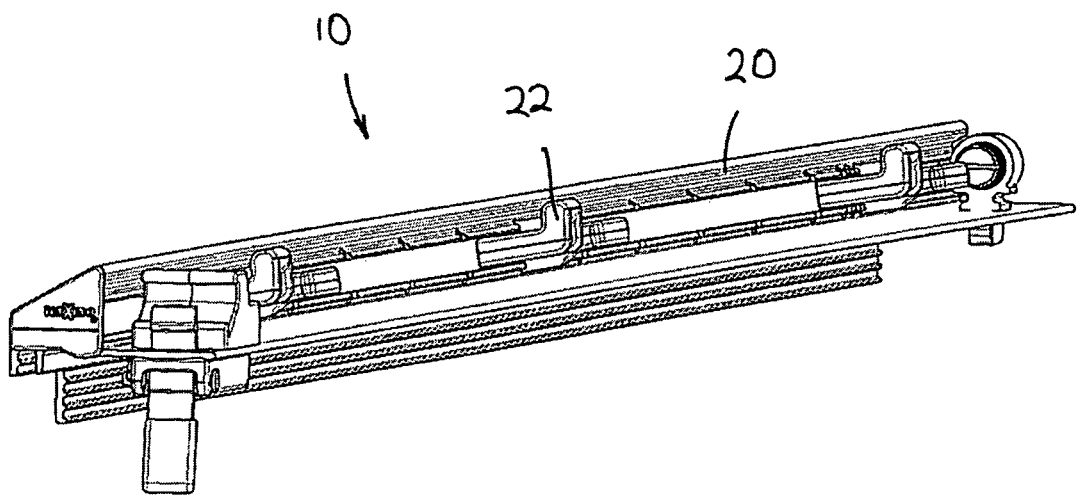
FIG. 2 is a perspective view of the tonneau cover cargo containment rail system according to an embodiment of the invention.

The cargo containment rail system 10 generally includes a rail 20 and at least one cargo hold down 22 that is attachable to the rail 20, as illustrated in FIG. 2. The rail 20 may include features that are generally found in rails used in conjunction with soft tonneau covers. A variety of clamps 24 may be used for attaching the rails 20 to the pickup bed 16.

Figure 3:
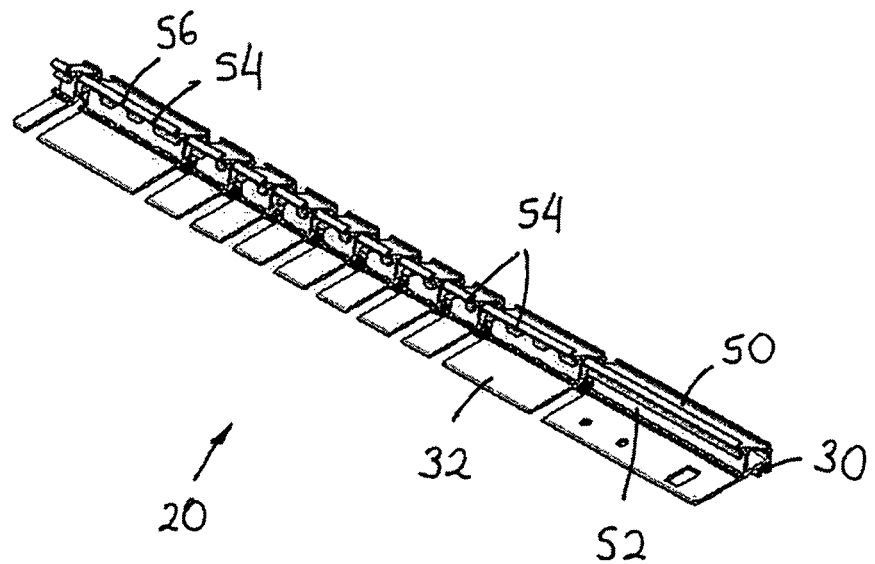
FIG. 3 is a perspective view of a rail for the tonneau cover cargo containment rail system where portions of the rail are removed therefrom to more clearly show the arrangement of cutouts in the rail.
Figure 4:
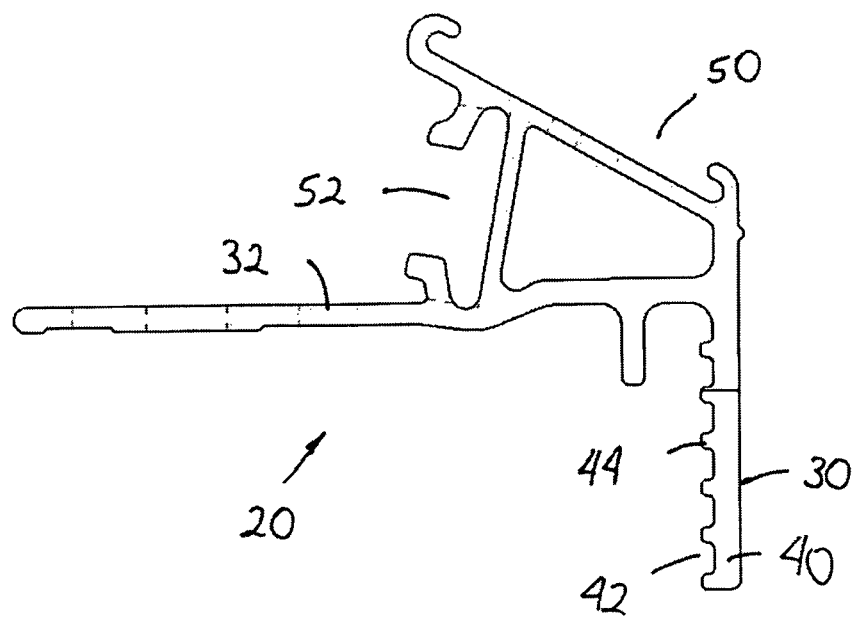
FIG. 4 is an end view of the rail.

In particular, the rail 20 includes a lower rail portion 30 and an upper rail portion 32, as illustrated in FIGS. 3 and 4. The lower rail portion 30 and the upper rail portion 32 may be oriented generally transverse to each other. The lower rail portion 30 may be utilized to attach the rail 20 to the side of the pickup bed.

A first surface 40 of the lower rail portion 30 that is positioned adjacent to the side of the pickup bed may be substantially flat. A second surface 42 of the lower rail portion 30, which is generally opposite the first surface 40, may have at least one ridge 44 extending therefrom. The at least one ridge 44 may be engaged by a clamp 80 that is used for attaching the rail 20 to the side of the pickup bed.

The upper rail portion 32 may be substantially flat to provide support for cross members (not shown) that extend under the soft tonneau cover (not shown). The rail 20 may also include an outwardly directed channel 50 intermediate the lower rail portion 30 and the upper rail portion 32. The channel 50 may be oriented at an acute angle with respect to both the lower rail portion 30 and the upper rail portion 32. The channel 50 is adapted to receive a releasably fastening device (not shown) that holds down the edges of the soft tonneau cover.

The rail 20 also includes an inwardly directed channel 52. Sides of the channel 52 partially extend over the channel 52 to facilitate retaining the cargo hold down 22 in the channel 52 while permitting the cargo hold down 22 to laterally slide with respect to the channel 52.

A plurality of cutout 54 are formed in the channel 52. The cutouts 54 may have a width that is approximately the same as a width of a lower portion of the channel 52. While the cutouts 54 are illustrated as having a generally circular configuration, the cutouts 54 may be formed in a variety of shapes utilizing the concepts of the invention.

The cutouts 54 may be oriented at a first spacing of about 10 inches. The cutouts 54 are adapted to receive a portion of the cargo hold down 22 to thereby retain the cargo hold down 22 in a stationary position with respect to the rail 20.

At least one cutout 56 is oriented at a second spacing that is different from the first spacing. In one configuration, the second spacing is about one inch. The cargo hold down 22 may be placed into engagement with the rail 20 by positioning the cargo hold down 22 over the cutout 56 and the adjacent cutout 54 that are in the second spacing.

While the figures illustrate that the technique for attaching the cargo hold down 22 to the tonneau cover rail 20 is a channel 52, it is possible to use alternative techniques for attaching the cargo hold down 22 to the tonneau cover rail 20. An example of one such alternative technique is a single extension that extends from the tonneau cover rail 20. In certain embodiments the extension may have a variety of shapes, examples of such shapes include T-shape and L-shape.

The cargo hold down 22 would have a recess formed therein that is adapted to receive a portion of the extension. Similar to the embodiment illustrated in the figures, this configuration could enable the cargo hold down 22 to slide with respect to the tonneau cover rail 20.

While it is possible for frictional engagement between the handle portion and the base portion to retain the cargo hold down 22 in a stationary position with respect to the tonneau cover rail 20, the extension may include a plurality of recesses that are adapted to receive a portion of the handle portion to facilitate retaining the cargo hold down 22 in a stationary position with respect to the tonneau cover rail 20.

Figure 5:
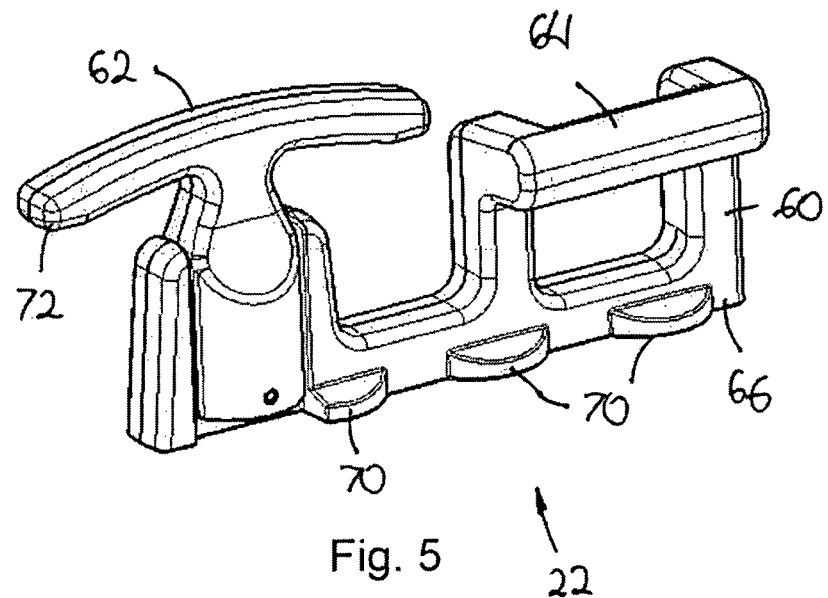
FIG. 5 is a perspective view of a cargo hold down for the tonneau cover cargo containment rail system.
Figure 6:
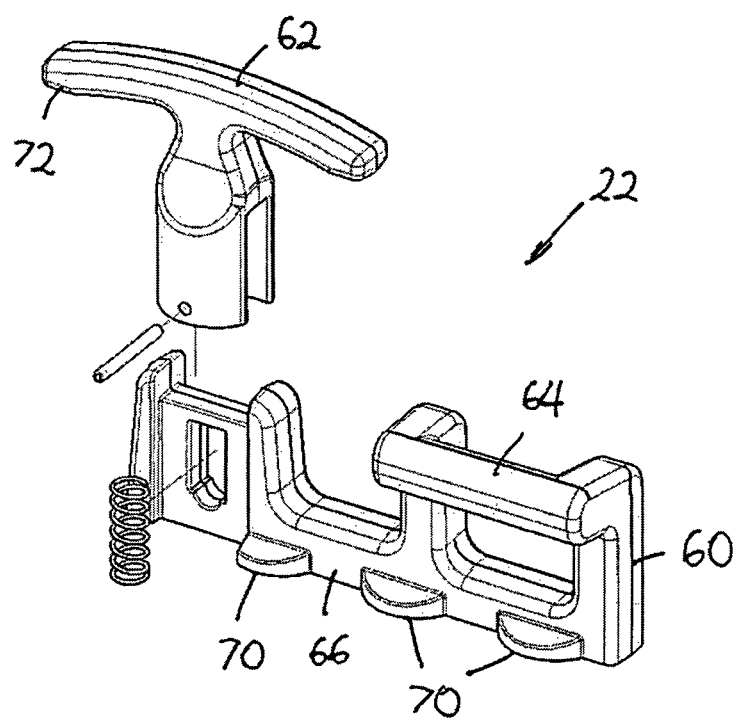
FIG. 6 is an exploded perspective view of the cargo hold down of FIG. 5.

The cargo hold down 22 has a base portion 60 and a handle portion 62, as illustrated in FIGS. 5 and 6. The base portion 60 includes at least one tie down 64 that is in a spaced-apart relationship with respect to a base 66 such that an axis of the at least one tie down 64 is offset from an axis of the base 66 in at least two coordinate directions. The tie down 64 is adapted to receive an object that is used to restrain cargo from movement such as rope or bungee cords.

The base 66 has two sets of extensions 70 extending therefrom. The extensions 70 may at least partially conform to the surface of the cutouts 54. The extensions 70 are oriented at the second spacing. This configuration enables the cargo hold down 22 to be placed in the channel 52 by positioning the extensions 70 over the cutout 54 and the cutout 56, which are oriented in the second spacing.

The handle portion 62 may include a gripping section 72 that facilitates moving the handle portion 62 with respect to the base portion 60. The handle portion 62 may be operably attached to the base portion 60 for movement between an engaged position and a disengaged position. The handle portion may be biased to the engaged position.

When the handle portion 62 is in the engaged position, a lower surface of the handle portion 62 at least partially extends into one of the cutouts 54. The handle portion 62 thereby prevents the cargo hold down 22 from moving with respect to the rail 20. Alternatively, when the handle portion 62 is in the disengaged position, the cargo hold down 22 is slidable with respect to the rail 20.

Figure 7:
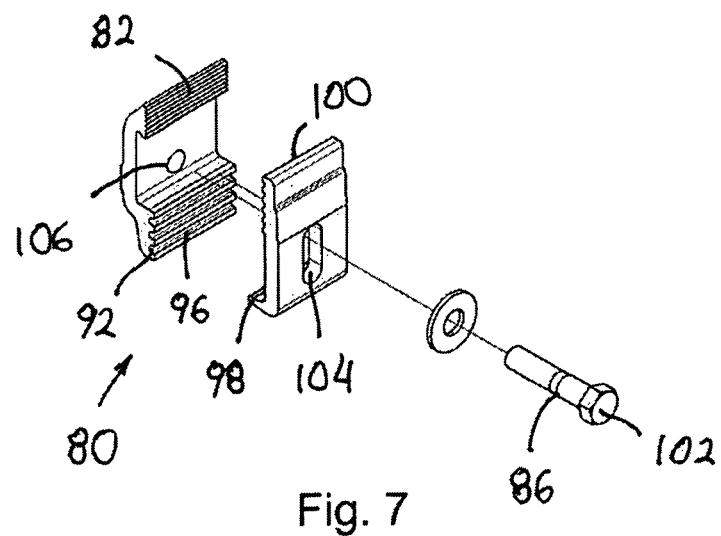
FIG. 7 is an exploded perspective view of a clamp assembly for the tonneau cover cargo containment rail system.

The cargo containment rail system 10 may also include a clamping mechanism 80 to use for mounting the rail 20 with respect to the side of the pickup bed. One such clamping mechanism 80 is illustrated in FIG. 7.

The clamping mechanism 80 may include an inner clamp plate 82, an outer clamp plate 84 and a fastener 86. The inner clamp plate 82 may have a length that is greater than a length of the outer clamp plate 84 to enhance the ability to retain the clamping mechanism 80 in a stationary position with respect to the side of the pickup bed. The increased length of the inner clamp plate 82 also reinforces the side of the pickup bed from deformation caused by forces placed on the cargo hold down.

The inner clamp plate 82 includes an upper end 90 and a lower end 92. The upper end 90 may include at least one ridge 94 formed in the surface thereof. The at least one ridge 94 enhances the ability of the clamping mechanism 80 to maintain a stationary relationship with respect to the side of the pickup bed.

The lower end 92 may include at least one receiving channel 96. The at least one receiving channel 96 is adapted to receive a pivot pin 98 on the outer clamp plate 84 to facilitate pivoting of the outer clamp plate 84 with respect to the inner clamp plate 82.

In addition to the pivot pin 98, the inner clamp plate 82 may include at least one ridge 100 formed in an upper surface thereof. The at least one ridge 100 enhances the ability of the clamping mechanism 80 to grip the lower rail portion 30.

The fastener 86 may include at least one bolt 102 that extends through an aperture 104 in the outer clamp plate 84 and into a threaded aperture 106 in the inner clamp plate 82. Rotating the bolt 102 thereby enables a distance between the inner clamp plate 82 and the outer clamp plate 84 to be changed. Alternatively, it is possible to operably connect the inner clamp plate 82 and the outer clamp plate 84 with a mechanism that permits manual operation.

Figure 8:
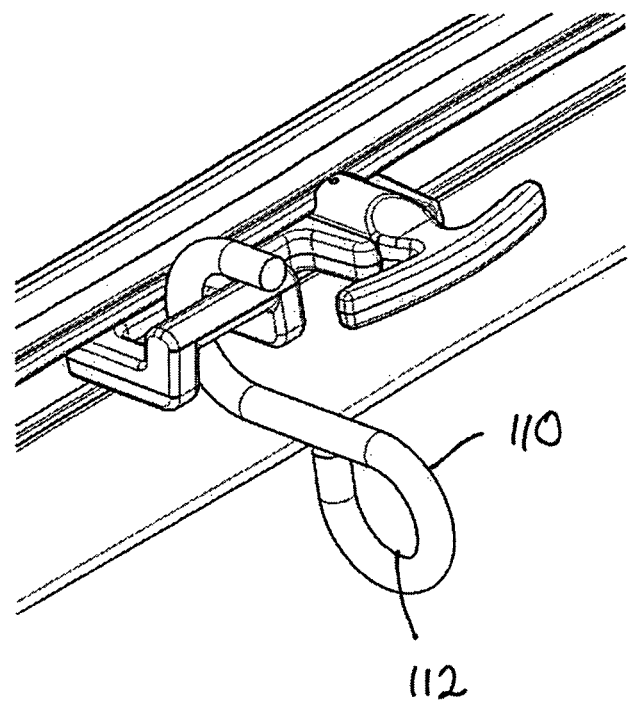
FIG. 8 is a perspective view of an alternative configuration of the cargo hold down.

In another configuration of the cargo hold, which is illustrated in FIG. 8, the handle portion 110 includes a loop 112. Grasping the loop 112 facilitates movement of the handle portion 110 from the engaged position to the disengaged position.

Figure 9:
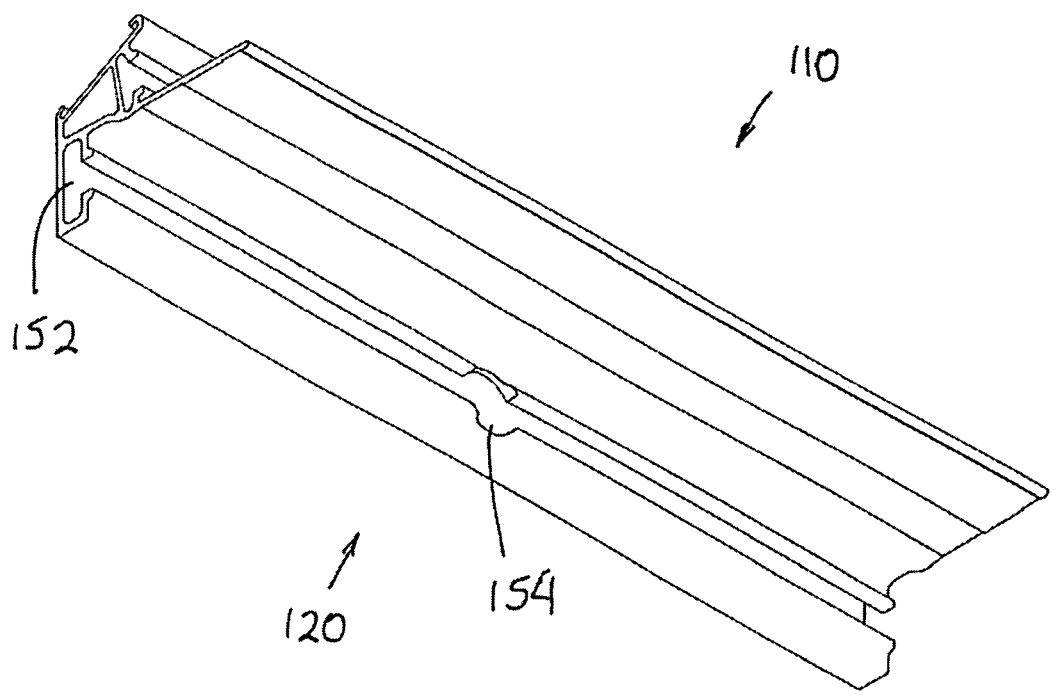
FIG. 9 is a perspective view of an alternative configuration of the rail.

An alternative configuration of the rail 120 is illustrated in FIG. 9. In this configuration, the channel 152 utilized for attachment of the cargo hold down is positioned on a lower portion of the rail 120 and includes at least one cutout 154. This configuration may be utilized for attaching the rail 120 to the side of the pickup bed with a plurality of bolts. The number and size of the bolts may be selected based upon the anticipated loads that will be placed on the cargo containment rail system 1 10.

To enhance the strength of the cargo containment rail system 110, at least one backer plate may be provided on a back side of the side of the pickup bed. The backer plate thereby reduces the potential of the side of the pickup bed from being deformed in response to forces being placed upon the cargo hold downs.

In the preceding detailed description, reference is made to the accompanying drawings, which form a part hereof, and in which is shown by way of illustration specific embodiments in which the invention may be practiced. In this regard, directional terminology, such as "top," "bottom," "front," "back,"

"leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A pickup bed covering and object restraint system for a pickup bed, the pickup bed having at least one side, the pickup bed covering and object restraint system comprising:
a tonneau cover rail attachable to the pickup bed side, the tonneau cover rail having a plurality of first cutouts being positioned there along at a first spacing distance, the tonneau cover rail having at least one second cutout being positioned at a second spacing distance from at least one of the plurality of first cutouts, the second spacing distance being different than the first spacing distance; and
a cargo hold down having a base portion and a handle portion, the base portion having extensions extending therefrom at the second spacing distance to permit passing of the extensions through the at least one second cutout and the at least one of the plurality of first cutouts to slidably couple the cargo hold down to the tonneau cover rail, the extensions slidably engaging the tonneau cover rail to retain the cargo hold down in engagement with the tonneau cover rail while permitting the cargo hold down to slide with respect to the tonneau cover rail, the handle portion is operably attached to the base portion for movement between an engaged position and a disengaged position, the handle portion having a lower surface selectively mating with any one of the plurality of first cutouts in the engaged position to retain the cargo hold down at a position along the tonneau cover rail associated with any one of the plurality of first cutouts.

2. The pickup bed covering and object restraint system according to claim 1 wherein the lower surface of the handle portion is complementarily shaped relative to the plurality of first cutouts to provide a mechanical engagement of the handle portion relative to the tonneau cover rail.

3. The pickup bed covering and object restraint system according to claim 1 wherein at least one of the base portion and the handle portion have a tie down recess formed therein.

4. The pickup bed covering and object restraint system according to claim 1 wherein the handle portion is biased to the engaged position.

5. The pickup bed covering and object restraint system according to claim 1, wherein the tonneau cover rail is a first channel that is defined by a first side member and a second side member, wherein the first side member and the second side member define a first width region and a second width region, wherein the first width region is greater than the second width region, and wherein the first width region is intermediate the second width region and a point at which the first side member is attached to the tonneau cover rail.

6. The pickup bed covering and object restraint system according to claim 5, wherein the base portion proximate at least one of the extensions has a width that is greater than the second width and less than the first width.

7. The pickup bed covering and object restraint system according to claim 1, wherein the extensions have a semi-circular profile.

8. The pickup bed covering and object restraint system according to claim 1, wherein the tonneau cover rail includes an upper rail portion and a lower rail portion, wherein upper rail portion is capable of supporting a portion of a tonneau cover and wherein the lower rail portion facilitates attachment of the tonneau cover rail to a side of a pickup bed.

9. The pickup bed covering and object restraint system according to claim 1 wherein the handle portion is T-shaped.

10. The pickup bed covering and object restraint system according to claim 1 wherein said base portion comprises a tie down and a base, an axis of said tie down being offset relative to an axis of said base in at least two coordinate directions.

11. A pickup bed covering and object restraint system for a pickup bed, said pickup bed having a pair of sides and an upwardly directed opening, said pickup bed covering and object restraint system comprising:
a pair of tonneau cover rails attachable to the pickup bed sides, the pair of tonneau cover rails each having a plurality of first cutouts being positioned there along at a first spacing distance, the pair of tonneau cover rails each having at least one second cutout being positioned at a second spacing distance from at least one of the plurality of first cutouts, the second spacing distance being different than the first spacing distance;
a cargo hold down having a base portion and a handle portion, the base portion having extensions extending therefrom at the second spacing distance to permit passing of the extensions through the at least one second cutout and the at least one of the plurality of first cutouts to slidably couple the cargo hold down to at least one of the pair of tonneau cover rails, the extensions slidably engaging the tonneau cover rail to retain the cargo hold down in engagement with the tonneau cover rail while permitting the cargo hold down to slide with respect to the tonneau cover rail, the handle portion is operably attached to the base portion for movement between an engaged position and a disengaged position, the handle portion having a lower surface selectively mating with any one of the plurality of first cutouts in the engaged position to retain the cargo hold down at a position along the tonneau cover rail associated with any one of the plurality of first cutouts; and
a tonneau cover mounted to the pair of tonneau cover rails, wherein the tonneau cover substantially covers the upwardly directed opening when in a closed position.

12. The pickup bed covering and object restraint system according to claim 11 wherein the lower surface of the handle portion is complementarily shaped relative to the plurality of first cutouts to provide a mechanical engagement of the handle portion relative to the tonneau cover rail.

13. The pickup bed covering and object restraint system according to claim 11 wherein at least one of the base portion and the handle portion have a tie down recess formed therein.

14. The pickup bed covering and object restraint system according to claim 11 wherein the handle portion is biased to the engaged position.

15. The pickup bed covering and object restraint system according to claim 11, wherein the pair of tonneau cover rails each is a first channel that is defined by a first side member and a second side member, wherein the first side member and the second side member define a first width region and a second width region, wherein the first width region is greater than the second width region, and wherein the first width region is intermediate the second width region and a point at which the first side member is attached to the tonneau cover rail.

16. The pickup bed covering and object restraint system according to claim 15, wherein the base portion proximate at least one of the extensions has a width that is greater than the second width and less than the first width.

17. The pickup bed covering and object restraint system according to claim 11, wherein the extensions have a semicircular profile.

18. The pickup bed covering and object restraint system according to claim 11, wherein the tonneau cover rail includes an upper rail portion and a lower rail portion, wherein upper rail portion is capable of supporting a portion of a tonneau cover and wherein the lower rail portion facilitates attachment of the tonneau cover rail to a side of a pickup bed.

19. The pickup bed covering and object restraint system according to claim 11 wherein the handle portion is T-shaped.

20. The pickup bed covering and object restraint system according to claim 11 wherein said base portion comprises a tie down and a base, an axis of said tie down being offset relative to an axis of said base in at least two coordinate directions.

21. A method of covering a pickup bed and restraining objects placed in the pickup bed, said pickup bed having an upwardly directed opening, wherein the method comprises:
attaching a tonneau cover rail to each side of a pickup bed, wherein each of the tonneau cover rails has a plurality of first cutouts being positioned there along at a first spacing distance, the tonneau cover rail having at least one second cutout being positioned at a second spacing distance from at least one of the plurality of first cutouts, the second spacing distance being different than the first spacing distance;
engaging a cargo hold down having a base portion and a handle portion to at least one of the tonneau cover rails, the base portion having extensions extending therefrom at the second spacing distance that pass through the at least one second cutout and the at least one of the plurality of first cutouts to slidably couple the cargo hold down to the tonneau cover rail, the extensions slidably engaging the tonneau cover rail to retain the cargo hold down in engagement with the tonneau cover rail while permitting the cargo hold down to slide with respect to the tonneau cover rail;
moving the handle portion with respect to the base portion from a disengaged position to an engaged position, the handle portion having a lower surface selectively mating with any one of the plurality of first cutouts in the engaged position to retain the cargo hold down at a position along the tonneau cover rail associated with any one of the plurality of first cutouts; and
attaching a tonneau cover to the tonneau cover rails so that the tonneau cover substantially covers the upwardly directed opening when in a closed position.

22. The method of claim 21, wherein at least one of the base portion and the handle portion have a tie down recess formed therein.

23. The method of claim 21, wherein the handle portion is biased to the engaged position.

* * * * *